March 14, 1939.     E. W. SWANSON     2,150,663
SYNCHRONOUS MOTOR CONTROL SYSTEM
Filed Dec. 4, 1937

INVENTOR.
EDWIN W. SWANSON
BY Akel C. Benson
HIS ATTORNEY

Patented Mar. 14, 1939

2,150,663

UNITED STATES PATENT OFFICE 2,150,663

SYNCHRONOUS MOTOR CONTROL SYSTEM

Edwin W. Swanson, Hopkins, Minn., assignor to Electric Machinery Mfg. Company, Minneapolis, Minn.

Application December 4, 1937, Serial No. 178,082

8 Claims. (Cl. 172—289)

My invention relates to synchronous motor control systems and particularly to systems for controlling the excitation of the field winding of a synchronous motor.

An object of the invention resides in providing a system by means of which the synchronizing torque of the motor is increased.

Another object of the invention resides in providing a system in which the field winding of the motor is connected to the source of field excitation when the frequency of the induced field current decreases to a predetermined value.

An object of the invention resides in providing a system in which the motor is connected to the source of field excitation when the primary magnetic field and the direct current magnetic field have a predetermined relative angularity so as to produce a high synchronizing torque.

A still further object of the invention resides in providing a system in which the field winding is disconnected from the source of excitation whenever the motor pulls out of synchronous operation, and in which the connection of the field winding to the source of excitation is automatically reestablished whenever conditions become proper for resynchronizing.

Another object of the invention resides in providing a system which can be accurately adjusted.

Another object of the invention resides in providing a system which will repeatedly operate in the same manner.

Another object of the invention resides in providing a system which will be dependable in its operation.

Other objects of the invention reside in the novel combination of parts and in the details of construction hereinafter illustrated and/or described.

With systems generally used heretofore for synchronizing synchronous motors, no adjustment of the operation of the devices used in the systems could be made and field excitation could not be applied at a desired instant and in most cases, excitation was not applied at the instant at which the greatest synchronizing torque would be obtained. The present invention overcomes this disadvantage by providing a system in which adjustment of the parts may be utilized to apply field excitation at any predetermined instant of time and particularly at such time as will produce the greatest synchronizing torque, and in which the excitation is always applied at the same rotor displacement angle for each adjustment of the system.

Figure 1:
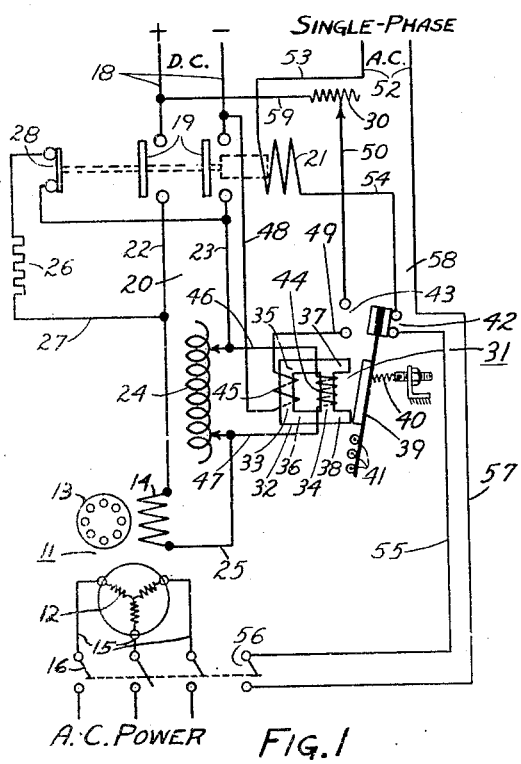
Fig. 1 is a wiring diagram illustrating an embodiment of my invention.

In the form of the invention disclosed in Fig. 1, I have shown a synchronous motor 11 which is of the self-starting type. This motor includes an armature winding 12 which in this case is a three-phase winding and which with the particular type of motor illustrated happens to be disposed on the stator. The motor 11 further includes a squirrel cage or secondary winding 13 which is carried by the rotor and which reacts with the armature winding 12 to give starting and accelerating torque to the motor. The rotor also carries a field winding 14 to which field excitation is applied when the rotor comes up to proper speed.

For supplying power to the motor 11, a source of three-phase alternating current is utilized which is connected to the armature winding 12 by means of a power line 15. A line switch 16 in this line controls the starting and stopping of the motor. This switch has been shown as manually operated though it can be readily comprehended that any well know electroresponsive or automatic means may be employed.

For applying excitation to the field winding 14, a source of direct current is employed which is connected to a direct-current line 18. A field switch 19 is connected in this line, and controls the field excitation to the motor. This switch is electroresponsive and is operated by means of a coil 21. The field-winding circuit is indicated at 20 and comprises two conductors 22 and 23 which lead from the switch 19. The conductor 22 is directly connected to the field winding 14 while the conductor 23 is connected to an adjustable reactance 24 which in turn is connected by means of a conductor 25 to the other side of the field winding 14. The purpose of this reactance will be subsequently described in detail.

To prevent excessive voltage in the field winding 14 before the field excitation is applied, a field discharge resistance 26 is employed which is connected in a circuit 27 shunting the field winding 14 during starting. In this circuit is connected a switch 28 which is also operated by the coil 21. This switch is normally closed and opens when the field switch 19 is closed. While the motor is being brought up to speed, the discharge resistance 26 is in series with the field winding 14 and only when the motor is being synchronized will this resistance be disconnected.

In the disclosed embodiments of the invention, the apparatus comprising the invention includes a polarized relay 31 which will now be described in detail.

Relay 31 includes a laminated core 32 which is constructed with two legs 33 and 34, connected together by means of two end pieces, 35 and 36. These end pieces extend outwardly beyond the leg 34 to form pole pieces 37 and 38. A relay armature 39 is pivoted at any one of the various adjustable points shown at 41 in Fig. 1, and is adapted to swing toward and from pole pieces 37 and 38. An adjustable spring 40 is attached to the relay armature 39 to provide adjustable means for controlling the time interval necessary to open the armature 39. The relay armature 39 and core 32 are preferably arranged so that the armature drops open by the force of gravity, when practically no magnetic flux flows through the armature 39.

The armature 39 operates a normally closed switch 42, and a normally open switch 43 which is closed when sufficient flux flows through the armature 39. An alternating-current coil 44 is mounted on the leg 34 of core 32 and is connected across the adjustable reactance 24 by means of conductors 46 and 47. Thus, the coil 44 is connected across a reactance which is at all times in series with the field winding 14 of the motor. A direct-current coil 45 is mounted on the leg 33 and one end of the coil 45 is connected by a conductor 48 to the direct-current line 18. The other end of the coil 45 is connected by means of a conductor 49 to the normally open switch 43, which in turn is connected by another conductor 50 to a rheostat 30. Rheostat 30 is connected to the direct-current line 18 by a conductor 59.

The field switch 19 is operated by the coil 21 which is energized by alternating current from a single-phase alternating-current line 52. A conductor 53 connects one side of this line to one end of coil 21. Another conductor 54 connects the other end of the coil to the normally closed switch 42 of relay 31. This switch is in turn connected by means of a conductor 55 to an auxiliary switch 56, which is operated in unison with the line switch 16. The other side of the switch 56 is connected to the single-phase alternating-current line 52 by means of a conductor 57. The switches, 42 and 56, and the coil 21 are all in a circuit formed by the various conductors referred to, which circuit I refer to as the control circuit and which is indicated by the reference numeral 58.

Figure 2:
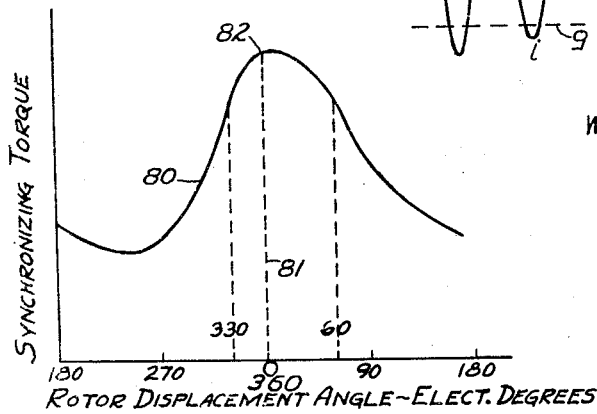
Fig. 2 is a diagram showing the resulting synchronizing torque when the field excitation is applied at various rotor displacement angles.

In Fig. 2, I have shown a curve which gives the synchronizing torque of the motor with excitation applied at different displacement angles of the rotor magnetic poles with reference to the stator magnetic poles. This diagram shows the relationship of the synchronizing torque plotted as ordinates to the rotor displacement angle in electrical degrees at which excitation is applied plotted as abscissas. The resulting curve is indicated by the reference numeral 80. It is well known that maximum synchronizing torque is obtained near the instant when the direct-current magnetic poles are directly opposite the armature magnetic poles of opposite polarity. For the sake of convenience this angle has been referred to as 0 or 360 degrees and is indicated by the line 81. Maximum torque at this point is designated by the numeral 82. An angle of 45 electrical degrees occurs when the direct-current magnetic poles are 45 degrees ahead (in the generator zone) of the armature magnetic poles of opposite polarity; and an angle of 180 electrical degrees occurs when the direct-current magnetic poles are directly opposite the armature poles of like polarity, at which positions there are repellant or bucking forces. The motor zone is included between 180 degrees and 360 degrees while the generator zone is included between 0 degrees and 180 electrical degrees. It will be noted by reference to Fig. 2 that the synchronizing torque is greater when the field excitation is applied at rotor displacement angles from 330 to 60 degrees, also that the synchronizing torque is minimum in the neighborhood of 240 degrees. It therefore becomes highly desirable to apply field excitation when the displacement angle is within the limits of 330 to 60 degrees.

Figure 3:
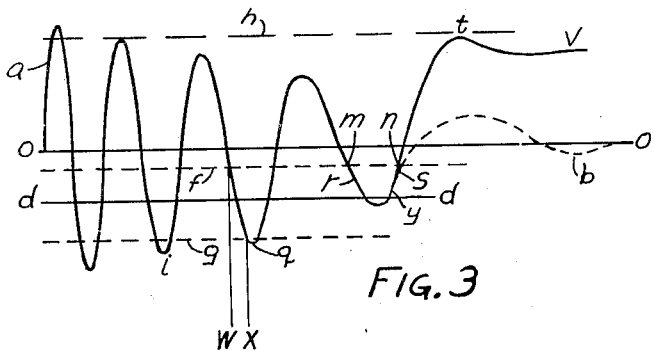
Fig. 3 is a diagram of the field current before, during, and after applying excitation to the motor field winding.

When a synchronous motor is started and the field winding is shorted through a discharge resistance, an alternating current is induced in the field-winding circuit which current diminishes in frequency as synchronism is approached. Such current between 90% of synchronous speed and synchronous speed varies in accordance with the curves $asb$ of Fig. 3 with reference to the axis $o$—$o$. Curve $asb$ represents the flux in the armature 39 of relay 31, which varies in accordance with the induced field discharge current above referred to. Due to the direct-current coil 45, a uniform flux component is produced in the armature 39 which is represented by the distance between the lines $o$—$o$ and $d$—$d$. The resultant effect would be to shift the axis of magnetization $o$—$o$ to the line $d$—$d$, the actual curve $asb$ not being changed in form. It will thus be seen that the crests of the waves in Fig. 3 are greater on one side of the resultant axis $d$—$d$ which phenomena is utilized in my invention.

The relay 31 is so designed that once its armature 39 has been attracted by the core 32, the armature will not be released until the flux therein drops below the values represented by the lines $f$ and $g$. Furthermore, the armature 39 is so designed that unless a time interval greater than that represented by the distance between the lines $w$ and $x$ occurs during which the flux above referred to exists, the armature will not be released. It will thus be readily seen that when the frequency is such as designed at $i$ or at $q$, the relay will not be released due to the fact that the duration of the releasing value of flux is insufficient. However, at the frequency indicated by the portions $r$ of the curve, the time interval during which the flux is insufficient to hold the armature 39 and which is represented by the horizontal distance between points $m$ and $n$ is considerably greater than the time represented by the distance between lines $w$ and $x$. The armature 39 will be released at such portion of the curve $asv$.

Relay 31 is designed so that the armature 39 will not be closed until the flux reaches values larger than that represented by line $h$ and which continue for a period of time substantially the same or slightly greater than for releasing. This feature is utilized to remove the direct-current excitation from the motor field winding 14, whenever the motor pulls out of synchronism.

My invention operates in the following manner:

Normally the line switch 16 is open and the polarized relay 31 is deenergized, also the switch 42 is closed and the switch 43 is open. Furthermore the field switch 19 is open and the field winding circuit 20 is closed through the discharge resistance 26. When A. C. power is applied to the armature winding 12, current is induced in the squirrel-cage winding 13 and also in the field winding 14. The rotor then commences to rotate and accelerate. This causes the current in the field-winding circuit to vary in frequency and value which near synchronous speed is similar to the curve *asb* of Fig. 3. This current at the instant of starting is great and the frequency thereof equal to line frequency so that the relay armature 39 is immediately attracted to the core 32. This immediately opens switch 42 and closes switch 43, so that direct current is applied to the direct-current coil 45. The armature 39 remains attracted to the core 32 until the speed of the rotor of motor 11 reaches a predetermined value near synchronous speed at which it becomes possible to apply field excitation to the field winding 14 for the purpose of procuring synchronous operation of the motor 11. At the frequency indicated at *q* in Fig. 3, the time represented by the distance between *w* and *x* is not sufficient to release the armature 39. However at *r*, the length of time during which the flux is insufficient to hold the armature attracted is represented by the horizontal distance between the points *m* and *n*, which is considerably greater. The armature 39 is now released. This opens switch 43 and closes switch 42. Assume that the relay armature is released at point *y*. The control circuit 58 is now completed and the coil 21 becomes energized which opens switch 28 and closes field switch 19. This disconnects the discharge resistance 26 and applies field excitation to the field winding 14. Due to the fact that a period of time delay elapses after energization of coil 21 and before closing field switch 19, excitation is not applied until some such time as indicated at *s*. Since it also takes some time to build the excitation current up to the full value, excitation would be complete at some point such as point *t*. This is at a rotor displacement angle between 330 and 60 degrees which gives a high synchronizing torque. It will become apparent that the torque occurring at the above rotor displacement angles is greater than that procured when the motor is synchronized at any other rotor displacement angle from 60 to 330 degrees. The portion of the curve at *v* represents the direct-current field excitation with the motor synchronized.

If at any time the motor pulls out of synchronism due to overload, voltage dip, or any other cause, alternating current would again be induced in the reactance 24. When the frequency and value of such current would be proper, armature 39 would again be attracted and control circuit 58 opened through switch 42. This would open switch 19, remove field excitation, and re-insert the field discharge resistance 26. The system would then be in condition for resynchronization permitting repetition of the sequence of operation previously described.

By increasing the direct current in the direct-current coil 45, by means of the rheostat 30, the relay 31 releases its armature 39 at a greater value of current so that both points *y* and *s* shift to the right, thus applying excitation at a later point and lesser rotor displacement angle in the generator zone. Conversely, by decreasing the direct current in the direct-current coil 45, the field excitation is applied at an earlier point and at a larger rotor displacement angle in the generator zone.

The relay armature 39 in Fig. 1 may be pivoted at any of the various pivot points shown at 41. By lowering the pivot point, the relay armature becomes slower acting and therefore applies excitation current at a higher speed. If the pivot point is raised upwardly, the relay armature becomes quicker acting and the relay applies excitation current at a lower motor speed.

Further adjustment may be obtained by varying the spring tension of the spring 40. By increasing the spring tension, the relay armature 39 will open in a shorter time interval so that excitation current will be applied at an earlier point and at a larger rotor displacement angle in the generator zone. Conversely by decreasing the spring tension of the spring 40, the relay armature 39 will open in a relatively longer time interval so that field excitation will be applied at a later point and at a smaller rotor displacement angle in the generator zone.

Adjustment of the relay coils may be made by proportioning the number of turns in each coil so that the desired ampere-turn strength is obtained in the relay.

Actual tests made with the form of my invention shown in Fig. 1 show excellent results. The legs of the laminated core were nine-sixteenths of an inch wide and one-half inch thick—the core being three and one quarter inches long. The alternating-current coil 44 was made of 400 turns of No. 23 B. & S. gauge copper wire and was subjected to approximately 50 volts from the reactance 24 at the instant of starting. The direct-current coil 45 was made of 6300 turns of No. 35 B. & S. gauge copper wire and was subjected to approximately 75 volts from a direct-current source. This relay in combination with a 200 horse-power, 300 R. P. M. synchronous motor supplied excitation current to the field winding at substantially 0 electrical degrees rotor displacement angle on every occasion. The resulting synchronizing torque was increased about 40% and the current disturbance was reduced considerably. Obviously this system would provide smooth action on the driven apparatus, thus eliminating broken gear teeth, flapping belts, or jumping off belts on many commercial applications.

Figure 4:
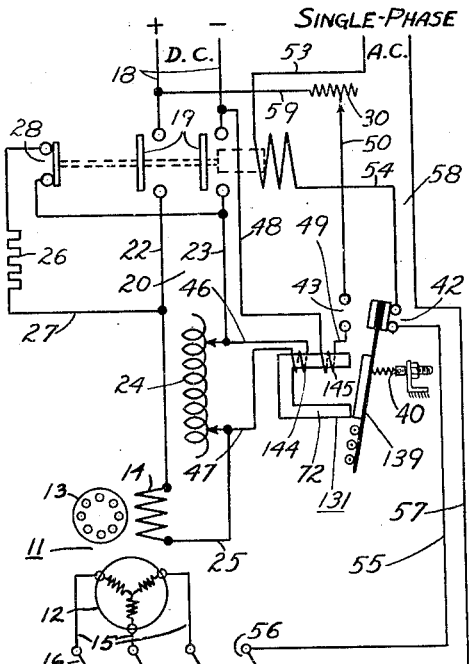
Fig. 4 is a wiring diagram of a modification of the invention.

In Fig. 4, I have shown a modification of the invention. In this form of the invention a number of the elements are the same and the description of the similar parts of this form of the invention will not be repeated. The same reference numbers will however be used to designate like parts.

In the form of the invention shown in Fig. 4, the polarized relay 31 is dispensed with and another polarized relay, 131, having a different core structure is used in place thereof. The polarized relay 131 includes a laminated core 72 of ordinary U-shaped form, an alternating-current coil 144 connected across the reactance 24, and a direct-current coil 145 connected to the direct current line 18 in a similar manner to that described in connection with the system shown in Fig. 1. The relay armature 139 operates in identical manner to relay armature 39 of Fig. 1. Relay 131 operates between points *m* and *n* of Fig. 3 and applies excitation current at point *s* just as described in connection with the system disclosed in Fig. 1. Adjustment thereof can also be made in the same manner.

The advantages of my invention are manifest. With my invention, increased synchronizing torque results. At the same time, the current surge at the instant of synchronization is greatly reduced. My invention is adjustable to apply excitation within the most desirable rotor displacement angle limits and functions positively within a few degrees of the desired displacement angle to apply excitation when the proper conditions occur. In the event that the motor pulls out of synchronism, the system is immediately placed in condition for resynchronization.

It will be understood that my invention is not limited to the specific construction shown. To obtain further flexibility in the operative characteristics, taps may be used on the relay coils 44 and 45, so as to vary the number of effective turns. My invention besides being applicable to three-phase systems, is obviously applicable to other polyphase and single-phase systems by suitable changes which can be readily determined by one skilled in the art. If desired the core of the relay may be constructed as a permanent magnet and the direct-current coil thereof dispensed with.

While theories have been advanced as to operation of my synchronous motor control systems, this has been done with a view of facilitating the explanation thereof and it is to be understood that I do not bind myself to these or any other theories.

It will, of course, be understood that various changes may be made in the form, details, proportions and arrangements of the parts, without departing from the scope of my invention which, generally stated, consists in a device capable of carrying out the objects above set forth and in the novel parts and combination of parts disclosed and defined in the appended claims:

What I claim as new and desire to secure by Letters Patent is:

1. In combination, a synchronous motor having a field winding, an initially closed field discharge circuit therefor, switch means for opening said circuit and applying excitation thereto, a control circuit for actuating said switch means, including normally closed switch contacts, a relay having a magnetic core providing three parallel magnetic paths, a winding disposed on a portion of said core forming one of said magnetic paths and responsive to an electrical condition of the field winding, another winding disposed on a portion of said core forming another of said magnetic paths and energized by a source of direct current, an air gap in said third magnetic path and an armature movable to close said air gap, said armature being adapted when the motor is first energized to open said normally closed switch contacts and when the flux produced by the field discharge circuit decreases below a predetermined value and continues below such value for a predetermined length of time to reclose said normally closed switch contacts, said armature due to the flux produced by the direct-current winding causing reclosing of said normally closed switch contacts only when the magnetic field set up by the field excitation current and the magnetic field generated by the motor have predetermined relations.

2. In combination, a synchronous motor having a field winding, an initially closed field discharge circuit therefor, switch means for opening said circuit and applying excitation thereto, a control circuit for actuating said switch means, including normally closed switch contacts, a relay having a magnetic core constructed with two legs, end pieces connecting said legs together, said end pieces extending outwardly beyond one leg and forming pole pieces spaced to provide an air gap therebetween, an armature adapted to extend across said pole pieces and movable to close said air gap, a winding on one of said legs responsive to an electrical condition of the field winding, another winding on the other leg energized by a source of direct current, said armature being adapted when the motor is first energized to open said normally closed switch contacts and when the flux produced by the field discharge circuit decreases below a predetermined value and continues below such value for a predetermined length of time to reclose said normally closed switch contacts, said armature due to the flux produced by the direct-current winding causing reclosing of said normally closed switch contacts only when the magnetic field set up by the field excitation current and the magnetic field generated by the motor have predetermined relations.

3. In combination, a synchronous motor having a field winding, a source of excitation for said field winding, a control relay including a core having two parallel magnetic circuits, means responsive to the electrical condition of said motor field winding for causing magnetic flux in one of said circuits, a source of direct current for causing magnetic flux in the other of said circuits, an armature on said relay, both of said magnetic circuits including the entire active part of said armature, said armature being movable in response to the resultant flux produced therein by said parallel magnetic circuits, and means operated by said armature for controlling the connection of said source of excitation to said motor field winding.

4. In combination, a synchronous motor having a field winding, a source of excitation for said field winding, a relay having a core and an armature movable in response to the magnetization of said core, means at all times responsive to an electrical condition of said field winding for magnetizing said relay core, means controlled by the movement of said armature for unbalancing the positive and negative flux amplitudes produced in said core by said field responsive means to control initiation of movement of said armature and other means responsive to the movement of said armature for controlling the connection of said excitation source to said motor field winding.

5. In combination, a synchronous motor having a field winding, a source of excitation current for said field winding, a relay having a magnetic circuit including an armature movable in response to the flux in said magnetic circuit to attracted and retracted positions, means responsive to the current in said motor field winding for producing flux in said magnetic field circuit, means responsive to the movement of said relay armature to its attracted position for polarizing said relay whereby its armature is thereafter retracted only when the current in said field winding flows in a predetermined direction and means responsive to the retraction of said relay armature for connecting said source of excitation current to said field winding.

6. In combination, a synchronous motor having a field winding, a circuit for supplying excitation current to said field winding, a relay having a magnetic core and a movable armature responsive to the flux in said core, means responsive to an electrical condition of said motor field winding for producing a variable flux in said relay core, a circuit for supplying direct current, means responsive to the direct current in said second-named circuit for producing a constant flux in said core and means controlled by the movement of said armature for both controlling the response of said second flux producing means to said direct current and controlling the connection of said excitation current circuit to said field winding.

7. In combination, a synchronous motor having a field winding, a circuit for supplying excitation to said field winding, a relay having a core and a movable armature responsive to the flux in said core, a coil on said core responsive to an electrical condition of said motor field winding, a second coil on said core, a circuit for supplying direct current for energizing said second coil and means responsive to the movement of said armature for both controlling the connection of said second-named circuit and controlling the connection of said excitation circuit to said field winding to said second coil.

8. In combination, a synchronous motor having a field winding, a circuit for supplying excitation to said field winding, a relay having a core and a movable armature responsive to the flux in said core, a coil on said core responsive to an electrical condition of said motor field winding, a second coil on said core, a circuit for supplying direct cirrent for energizing said second coil and means operated by said armature for deenergizing said second coil upon application of excitation to said field winding and means operated by said armature for controlling the connection of said excitation circuit to said field winding.

EDWIN W. SWANSON.